(12) United States Patent
Chatham et al.

(10) Patent No.: US 11,739,994 B2
(45) Date of Patent: Aug. 29, 2023

(54) APPARATUS AND METHOD FOR LUBRICANT MANAGEMENT IN AN ELECTRIC VEHICLE

(71) Applicant: JAGUAR LAND ROVER LIMITED, Coventry (GB)

(72) Inventors: Chris Chatham, Coventry (GB); Dhillip Asokan, Coventry (GB); Kate Rouse, Coventry (GB); Oliver Stocks, Coventry (GB); Gael Chouchelamane, Coventry (GB); Richard Cook, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 26 days.

(21) Appl. No.: 16/970,353

(22) PCT Filed: Jan. 21, 2019

(86) PCT No.: PCT/EP2019/051405
§ 371 (c)(1),
(2) Date: Aug. 15, 2020

(87) PCT Pub. No.: WO2019/158318
PCT Pub. Date: Aug. 22, 2019

(65) Prior Publication Data
US 2021/0086585 A1  Mar. 25, 2021

(30) Foreign Application Priority Data

Feb. 16, 2018 (GB) ................................ 1802559
Feb. 26, 2018 (GB) ................................ 1803047

(51) Int. Cl.
*F25B 41/24* (2021.01)
*B60H 1/00* (2006.01)
(Continued)

(52) U.S. Cl.
CPC ......... *F25B 41/24* (2021.01); *B60H 1/00278* (2013.01); *B60H 1/00885* (2013.01);
(Continued)

(58) Field of Classification Search
CPC ............ B60H 1/00885; B60H 1/00278; B60H 1/00921; B60H 1/00392; B60H 1/323;
(Continued)

(56) References Cited

U.S. PATENT DOCUMENTS 5,035,119 A * 7/1991 Alsenz .................... F25B 41/31
62/223
6,318,116 B1 * 11/2001 Gabel ................... F25B 43/006
62/503

(Continued)

FOREIGN PATENT DOCUMENTS

DE   102013021360 A1   6/2015
EP      1422085 A1      5/2004

OTHER PUBLICATIONS

Combined Search and Examination Report corresponding to GB Application No. GB1802559.3, dated Jul. 24, 2018, 7 pages.
(Continued)

*Primary Examiner* — Kun Kai Ma
(74) *Attorney, Agent, or Firm* — Reising Ethington P.C.

(57) ABSTRACT

Embodiments of the present invention provide a lubricant management system (100) in a heat flux management system for an electric vehicle (150), comprising a vehicle air conditioning circuit comprising a refrigeration cycle refrigerant circuit (6) comprising at least a heat pump condenser (17) in thermal communication with a heat source (19), first and second evaporators (31, 131) each associated with an expansion valve (29, 129), and a refrigerant compressor (11), wherein the components are fluidly connected to one another by a refrigerant line (9,45), an accumulator (37)
(Continued)

having a lubricant storage capacity and comprising lubricant delivery means (38), the accumulator being fluidly coupled in the refrigerant line downstream of the first and second evaporators (31, 131) and upstream of the refrigerant compressor (11), wherein the first evaporator and the second evaporator are fluidly connected in parallel downstream of the heat pump condenser (17) and upstream of the accumulator (37) and the associated expansion valves (29, 129) are operable to control a refrigerant flow rate through the first and the second evaporators (31, 131) sequentially to flush lubricant from the first and second evaporators to the lubricant storage capacity of the accumulator (37).

20 Claims, 3 Drawing Sheets (51) Int. Cl.
  *F25B 41/20* (2021.01)
  *B60H 1/32* (2006.01)
(52) U.S. Cl.
  CPC ......... *B60H 1/00921* (2013.01); *F25B 41/20* (2021.01); *B60H 2001/00307* (2013.01); *B60H 2001/00949* (2013.01); *B60H 2001/3252* (2013.01)
(58) Field of Classification Search
  CPC ........ B60H 1/3214; B60H 2001/00307; B60H 2001/00949; B60H 2001/3252; B60H 2001/325; B60H 2001/3258; B60H 2001/3263; F25B 41/24; F25B 5/02; F25B 31/004; F25B 41/20; F25B 49/02; F25B 2339/047; F25B 2500/16; F25B 2600/2513
  See application file for complete search history.

(56) References Cited

U.S. PATENT DOCUMENTS

| | | |
|---|---|---|
| 2004/0093880 A1 | 5/2004 | Zheng et al. |
| 2010/0064700 A1 | 3/2010 | Ziehr et al. |
| 2010/0170271 A1 | 7/2010 | Lifson et al. |
| 2012/0117996 A1* | 5/2012 | Hinde ...................... F25B 7/00 62/468 |
| 2015/0292776 A1 | 10/2015 | Tepas et al. |
| 2016/0018145 A1 | 1/2016 | Ragazzi |
| 2019/0225047 A1* | 7/2019 | Porras ...................... F25B 5/02 |
| 2020/0378642 A1* | 12/2020 | Shimizu .................. F24F 11/64 |
| 2021/0010725 A1* | 1/2021 | Ishiyama .............. F25B 31/004 |

OTHER PUBLICATIONS

Combined Search and Examination Report corresponding to GB Application No. GB1803047.8, dated Aug. 2, 2018, 7 pages.
International Search Report corresponding to International Application No. PCT/EP2019/051405, dated May 21, 2019, 3 pages.
Written Opinion corresponding to International Application No. PCT/EP2019/051405, dated May 21, 2019, 6 pages.
Chinese Office Action with English summary corresponding to Chinese Application No. 201980013561.6, dated Feb. 3, 2023, 18 pages.

* cited by examiner

APPARATUS AND METHOD FOR LUBRICANT MANAGEMENT IN AN ELECTRIC VEHICLE

TECHNICAL FIELD

The present disclosure relates to a lubricant management system and particularly, but not exclusively, to lubricant management system for a heat flux management system of an electric vehicle. Aspects of the invention relate to a lubricant management system, to a heat flux management system comprising the lubricant management system, to a vehicle, and to a method of lubricant management, where a lubricant management system, a heat flux management system comprising the lubricant management system, a vehicle, and a method of lubricant management are the subjects of each the independent claims.

BACKGROUND

Heat flux management systems in electric vehicles comprise an air conditioning circuit comprising a heat pump circuit with a heating function and a refrigeration cycle refrigerant circuit each circuit being fluidly coupled to a compressor via a refrigerant line or conduit.

The refrigerant line carries a multi-phase fluid refrigerant mixed with a lubricant (e.g. oil). The lubricant being required to adjust the vapour quality of the mixture and to ensure the compressor in the air conditioning circuit remains functional.

Over time, the lubricant is stripped from the refrigerant mixture due to collection in various parts of the circuit such as in the evaporator(s) and condenser(s) of the heat pump circuit and the refrigerant circuit.

The invention applies to pure electric vehicles and improves lubricant management after prolonged compressor activation.

It is an aim of the invention to improve the efficiency of lubricant management in a heat flux management system.

It is an object of embodiments of the invention to at least mitigate one or more of the problems of the prior art.

SUMMARY OF THE INVENTION

Aspects and embodiments of the invention provide a lubricant management system, a heat flux management system comprising the lubricant management system, a vehicle, and a method of lubricant management as claimed in the appended claims.

According to an aspect of the invention, there is provided a lubricant management system in a heat flux management system for an electric vehicle, comprising a vehicle air conditioning circuit comprising at least a condenser in thermal communication with a heat source, at least two evaporators and a refrigerant compressor, an accumulator having a lubricant storage capacity and comprising lubricant delivery means, the accumulator being downstream of the at least two evaporators and upstream of the refrigerant compressor and fluidly coupled thereto,
wherein the at least two evaporators are each fluidly connected downstream of the condenser and upstream of the accumulator and a refrigerant flow rate through the at least two evaporators is controlled to flush lubricant from the at least two evaporators to the lubricant storage capacity of the accumulator.

According to an aspect of the invention, there is provided a lubricant management system in a heat flux management system for an electric vehicle, comprising a vehicle air conditioning circuit comprising a refrigeration cycle refrigerant circuit comprising at least a condenser in thermal communication with a heat source, at least two evaporators each associated with an expansion valve, and a refrigerant compressor, wherein the components are fluidly connected to one another by a refrigerant line, an accumulator having a lubricant storage capacity and comprising lubricant delivery means, the accumulator being fluidly coupled in the refrigerant line downstream of the at least two evaporators and upstream of the refrigerant compressor,
wherein the at least two evaporators are each fluidly connected in parallel downstream of the condenser and upstream of the accumulator and the associated expansion valves are operable to control a refrigerant flow rate through the first and the second evaporators sequentially to flush lubricant from the at least two evaporators to the lubricant storage capacity of the accumulator.

In certain embodiments, the refrigeration cycle refrigerant circuit comprises four evaporators each associated with an expansion valve. In this way, pooled lubricant can be flushed from all of the evaporators in the system.

In certain embodiments, the at least two evaporators are two or more of: the powertrain chiller, the battery chiller, the cabin evaporator and a condenser/evaporator.

In certain embodiments the accumulator comprises a sensor operable to monitor lubricant content in the refrigerant mixture. In this way, the system is able to monitor the content of lubricant and, if required, initiate a flush flow of refrigerant through the evaporators to return pooled lubricant to the accumulator.

In certain embodiments the accumulator sensor is operably linked to a controller which is configured (adapted, arranged, operable) to actuate the lubricant delivery means to maintain a required content of lubricant in the refrigerant mixture.

In certain embodiments the required content of lubricant is between about 1.5% (volume/volume) and about 4% (volume/volume) oil. More specifically the required content of lubricant is about 2% (volume/volume) oil. More specifically, the required content is a selected minimum threshold lubricant content in the refrigerant mixture.

In certain embodiments the lubricant delivery means is a drip tube.

In certain embodiments the lubricant delivery means comprises an internal orifice and associated filter net with the U-shaped tube in the accumulator.

In certain embodiments the system comprises a controller configured (adapted, arranged, operable) to actuate the expansion valves associated with each of the first and second evaporators.

In certain embodiments the controller is operable to open the expansion valve associated with the first evaporator and close the expansion valve associated with the second evaporator.

In certain embodiments the controller is operable to open the expansion valve associated with the second evaporator and close the expansion valve associated with the first evaporator.

In certain embodiments the controller is operable to actuate fluid flow sequentially through the first evaporator and then through the second evaporator.

In certain embodiments, the controller is operable to activate one of more of the valves in the system. More specifically, controller is operable to activate one of more of the valves in the air conditioning circuit.

In certain embodiments, the controller is operably linked to the sensors in the circuit.

In certain embodiments, the controller is operably linked to a timer. More specifically, the timer is operable to detect the duration of operation of the heat flux management system. In this way, the controller is operable to initiate a flush flow of refrigerant through the evaporators to return pooled lubricant to the accumulator when a pre-selected period of heat flux management system operation has elapsed.

In certain embodiments the controller is operable to determine when a vehicle charging event is underway. In this way, the controller is operable to initiate a flush flow of refrigerant through the evaporators to return pooled lubricant to the accumulator when a vehicle charging event is underway.

In certain embodiments the heat pump condenser is associated with an expansion valve.

In certain embodiments the expansion valve associated with the heat pump condenser is operable to control refrigerant mixture flow between the heat pump condenser and the first and second evaporators.

In certain embodiments the system comprises a controller configured (adapted, arranged, operable) to actuate the expansion valve associated with the heat pump condenser.

In certain embodiments the controller actuates the expansion valve associated with the heat pump condenser to induce an increased refrigerant mixture circulation rate capable of flushing trapped lubricant from the first and second evaporators to the accumulator.

In certain embodiments the increased refrigerant mixture circulation rate to provide flushing of the trapped lubricant is higher than the operating refrigerant mixture circulation rate during a cooling or heating cycle of refrigerant in the air conditioning circuit.

In certain embodiments the flushing circulation flow rate of refrigerant mixture is established by the compressor minimum operating speed and by the expansion valve associated with the condenser being in a fully opened throttle position. At this system arrangement, evaporation in the first and second evaporators (e.g. coolant refrigerant heat exchangers) upstream of the compressor is avoided.

In certain embodiments the operating circulation flow rate of refrigerant mixture is established by the compressor minimum operating speed and by the expansion valve associated with the condenser being in a partially opened throttle position.

According to another aspect of the invention there is provided a heat flux management system comprising the lubricant management system according to an aspect of the present invention.

In certain embodiments the heat flux management system comprises a heat pump circuit with a heating function comprising at least one thermodynamic cycler fluidly connected to the heat pump condenser and the refrigerant compressor by a refrigerant line.

According to another aspect of the invention there is provided a vehicle comprising an engine and the heat flux management system according to an aspect of the present invention.

In certain embodiments the engine is electrochemically powered.

According to yet another aspect of the invention, there is provided a method of lubricant management in an electric vehicle, comprising a. providing a lubricant management system according to an aspect of the present invention;

b. operating the refrigerant compressor to initiate a refrigerant mixture circulation in the refrigerant circuit for a selected time period at an operating circulation rate;

c. closing the expansion valve associated with a first or a second evaporator of the at least two evaporators;

d. flushing refrigerant mixture through the other of the first or the second evaporator to flush lubricant trapped in the evaporator to the accumulator;

e. opening the closed expansion valve associated with the first or the second evaporator;

f. closing the open expansion valve associated with the first or the second evaporator;

g. flushing refrigerant mixture through the other of the first or the second evaporator to flush lubricant trapped in the evaporator to the accumulator.

In certain embodiments the selected time period is up to 10 hours. More specifically the selected time period is between 1 and 10 hours.

In certain embodiments a further expansion valve associated with the heat pump condenser is throttled to increase the circulation rate of refrigerant mixture to the first or second evaporator to a flushing circulation rate.

In certain embodiments the operating circulation flow rate of refrigerant mixture is established by the compressor minimum operating speed and by the expansion valve associated with the condenser being in a partially opened throttle position.

In certain embodiments the flushing circulation flow rate of refrigerant mixture is established by the compressor minimum operating speed and by the expansion valve associated with the condenser being in a fully opened throttle position. At this system arrangement, evaporation in the first and second evaporators (e.g. coolant refrigerant heat exchangers) upstream of the compressor is avoided.

In certain embodiments the flushing circulation rate is applied for between about 2 and about 5 minutes. Thereafter, the operating circulation rate is resumed.

Wherein referred to herein "vapour quality" is the mass fraction in a saturated mixture that is vapour, therefore saturated vapour has a "vapour quality" of 100%, and saturated liquid has a "vapour quality" of 0%.

Wherein referred to herein a thermodynamic cycler is a component of a system which is operable to perform one or more of a series of thermodynamic processes (a thermodynamic cycle) which returns a system to its initial state.

When used herein, the terms "upstream" and "downstream" are the relative positions of one or more components relative to the fluid flow direction through the refrigeration circuit in which the component(s) are positioned.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Wherever possible, like reference numerals are used to depict the same features throughout.

Figure 1:
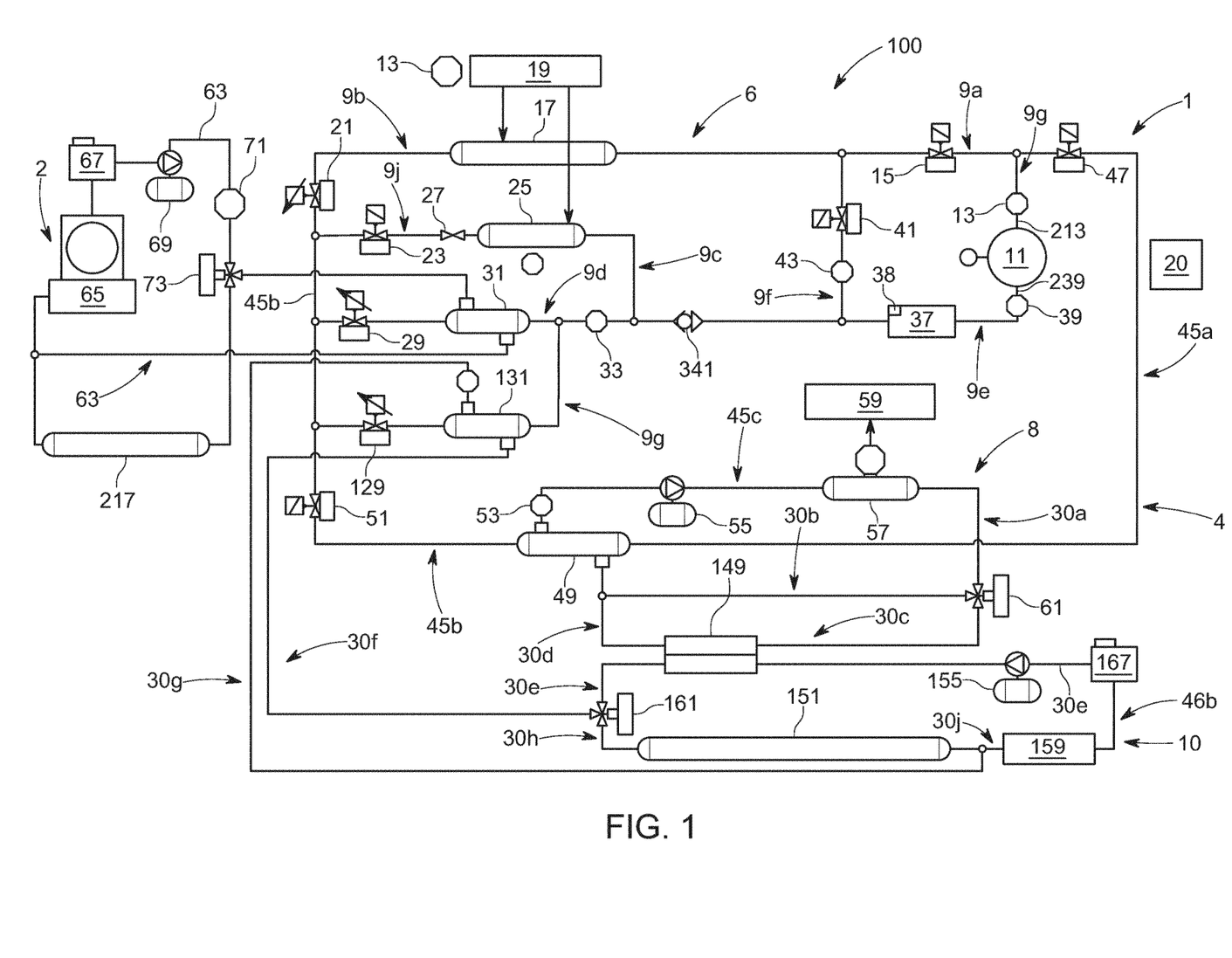
FIG. 1 shows a vehicle heat flux management system comprising a refrigeration circuit, a heat pump circuit and an additional heat source circuit.

As shown in FIG. 1, the combined heat flux management system 1 for the vehicle 150 (FIG. 3) comprises a refrigeration circuit 6 and a heat pump circuit 4. The components are indicated in the flow path of a fluid during operation within the respective circuits. When used herein "upstream" and "downstream" relate to the direction in which fluid will flow in the system.

In FIG. 1, the refrigeration cycle refrigerant circuit 6 comprises a refrigerant line 9a arranged to fluidly connect the compressor 11, a pressure and temperature sensor 13 and a shut-off valve 15 to an external air-refrigerant heat exchanger 17 operable as a heat pump condenser and thermally connected to a heat source, being ambient air 19; a second refrigerant line 9b arranged to fluidly connect the external heat exchanger 17 operable as a heat pump condenser and an expansion valve 21 associated with the external heat exchanger 17; and a further refrigerant line 9f arranged to fluidly connect external heat exchanger 17, shut off valve 41, temperature and pressure sensor 43 and accumulator 37. Expansion valve 21 associated with heat pump condenser 17 is fluidly connected to the evaporator/dehumidifier 25 through associated valves 23 and 27 and line 9j. Evaporator/dehumidifier 25 is fluidly connected to the accumulator 37 via refrigerant line 9c via cut off valve 341. The refrigerant side of evaporator 131 is fluidly connected to the heat pump condenser 17 via refrigerant line 45b. Associated expansion valves 21 and 129 are operable to control refrigerant flow from the heat pump condenser 17 to the evaporator 131. Evaporator 131 is further fluidly connected to the accumulator 37 via refrigerant line 9g and the cut off valve 341. Evaporators 31 and 131 and their associated expansion valves 29 and 129 respectively are arranged in parallel in the refrigeration circuit 6. As will be further described in relation to FIG. 2, the expansion valves 21, 29 and 129 are operable in conjunction with one another to manage the flow of refrigerant/lubricant mixture through the evaporators 31 and 131. Expansion valve 21 is operable to be throttled in order to increase and reduce the flow rate of refrigerant/lubricant mixture through one or more of the evaporators 31 and 131. An increased flow rate of refrigerant/lubricant mixture through the evaporators 31 and 131, flushes settled lubricant from the evaporators 31 and 131 and into the lubricant storage capacity and the lubricant delivery means 38 in the accumulator 37. The lubricant delivery means can be a drip tube or the like. Alternatively, the lubricant delivery means is an internal orifice and associated filter net with the U-shaped tube in the accumulator. The lubricant delivery means (e.g. drip tube or internal orifice and associated filter net with the U-shaped tube in the accumulator) is operable to supply lubricant fluid into the refrigerant/lubricant mixture according to the required vapour quality of the mixture and the volume of lubricant required in the refrigerant/lubricant mixture. Sensor 39 is operable to monitor the vapour quality and volume of lubricant in the refrigerant/lubricant mixture and is operably linked to the controller 20 which in turn is operably linked to at least the valves 21, 29, 129.

The heat pump circuit 4 comprises refrigerant lines 45b and 9j arranged to fluidly connect a evaporator/dehumidifier 25 which receives heat from ambient air 19 and associated shut-off valve 23 with indirect condenser 49 and associated shut off valve 51. The evaporator/dehumidifier 25 is in fluid communication with accumulator 37 via refrigerant line 9c via cut off valve 341. Refrigerant line 45b fluidly connects the shut-off valve 23 and expansion valve 29 associated with an evaporator 31 and line 45b fluidly connects indirect condenser 49 with evaporator 31 via associated valves 51 and 29 respectively. Refrigerant line 9e fluidly connects the accumulator 37 with the compressor 11 via compressor inlet 239 in which temperature and pressure sensor 39 is located to monitor the parameters of the refrigerant at the compressor inlet 239.

The heat pump circuit 4 comprises a refrigerant line 9g which is arranged to fluidly connect the outlet (213) of the compressor (11) and shut off valve 47 which is in its open position in the heat pump circuit 4. A pressure and temperature sensor 13 monitors the fluid exiting the compressor outlet 213. Refrigerant line 45a is arranged to fluidly connect the open shut-off valve 47 and an internal refrigerant to coolant heat exchanger, indirect condenser 49. The indirect condenser 49 is fluidly connected to the valves 23 and 29 associated with the evaporator/dehumidifier 25 and the evaporator 31 through shut off valve 51 in refrigerant line 45b. The evaporator/dehumidifier 25 and the evaporator 31 are each fluidly connected to the accumulator 37 via cut off valve 341 in the heating mode when associated valves 51, 23, 29, 341 are open. The accumulator 37 is fluidly connected to the inlet (239) of the compressor (11) and pressure and temperature sensor 39 is associated with the suction side of the compressor 11 and is operable monitors the fluid in line 9e at the inlet (239) of the compressor. The refrigeration lines allow the flow of refrigerant therethrough.

The heat pump circuit 4 comprises a coolant circuit 8 in which line 45c is arranged to fluidly connect a coolant side of the indirect condenser 49, a temperature sensor 53, a heat pump 55 and a second internal coolant to air heat exchanger 57 thermally coupled to a heat sink, being passenger cabin 59. A three-way valve 61 downstream of heat exchanger 57 is operable to direct coolant flow back to the indirect condenser 49 via line 30b or, in a second position, to direct coolant flow to both the indirect condenser 49 via line 30b and to coolant circuit 10 via line 30c in which the coolant is directed to a heat exchanger 149 from which coolant flows via lines 30e and valve 161 with which heat exchanger 149 is fluidly coupled, via line 30h to a further heat exchanger 151 and via line 30j to a second heat sink 159, being a traction battery of an electric vehicle. Coolant in coolant circuit 10 is returned to heat exchanger 149 via line 30e an expansion header tank 167 and pump 155.

In coolant circuit 10, three-way valve 161, in a second position, fluidly connects heat exchanger 149 with the coolant side of coolant-refrigerant heat exchanger 131 via line 30f which can be fluidly connected at its refrigerant side to the heat pump circuit 4 (i.e. accumulator 37) when associated valve 129 is open. The coolant side of heat exchange 131 is fluidly connected to the battery 159.

The components of the heat pump circuit 4 are connected by means of refrigerant pipes 9, 30, 45 which, in use, allow the flow of refrigerant and through the circuits 4, 8 and 10.

Still referring to FIG. 1, the vehicle heat flux management system 1 comprises an additional coolant circuit 2 comprising a heat source being a powertrain 65, fluidly connected to an expansion header tank 67 and a pump 69 via lines 63. Three way valve 73 is operable to switch coolant circuit 2 into fluid communication with heat pump circuit 4 via the coolant side of evaporator 31. Line 63 comprises a temperature sensor 71 to monitor the temperature of the powertrain 65 and the coolant in lines 63.

Three way valve 73 is operable to switch coolant circuit 2 into fluid communication with heat exchanger 217 when the coolant circuit is to be isolated from fluid communication with the heat pump circuit 4.

The compressor 11 is fluidly coupled to each of the refrigeration cycle refrigerant circuit 6 and the heat pump circuit 4 by the shut-off valve 15 and the shut-off valve 47 respectively. Each of valves 15 and 47 are downstream from the compressor 11. The mode of operation for the vehicle heat flux management system 1 can be changed from a heating mode to a cooling mode depending on the direction of refrigerant flow downstream from the compressor 11 high pressure side into one of these shut-off valves 15, 47 respectively.

Figure 2:
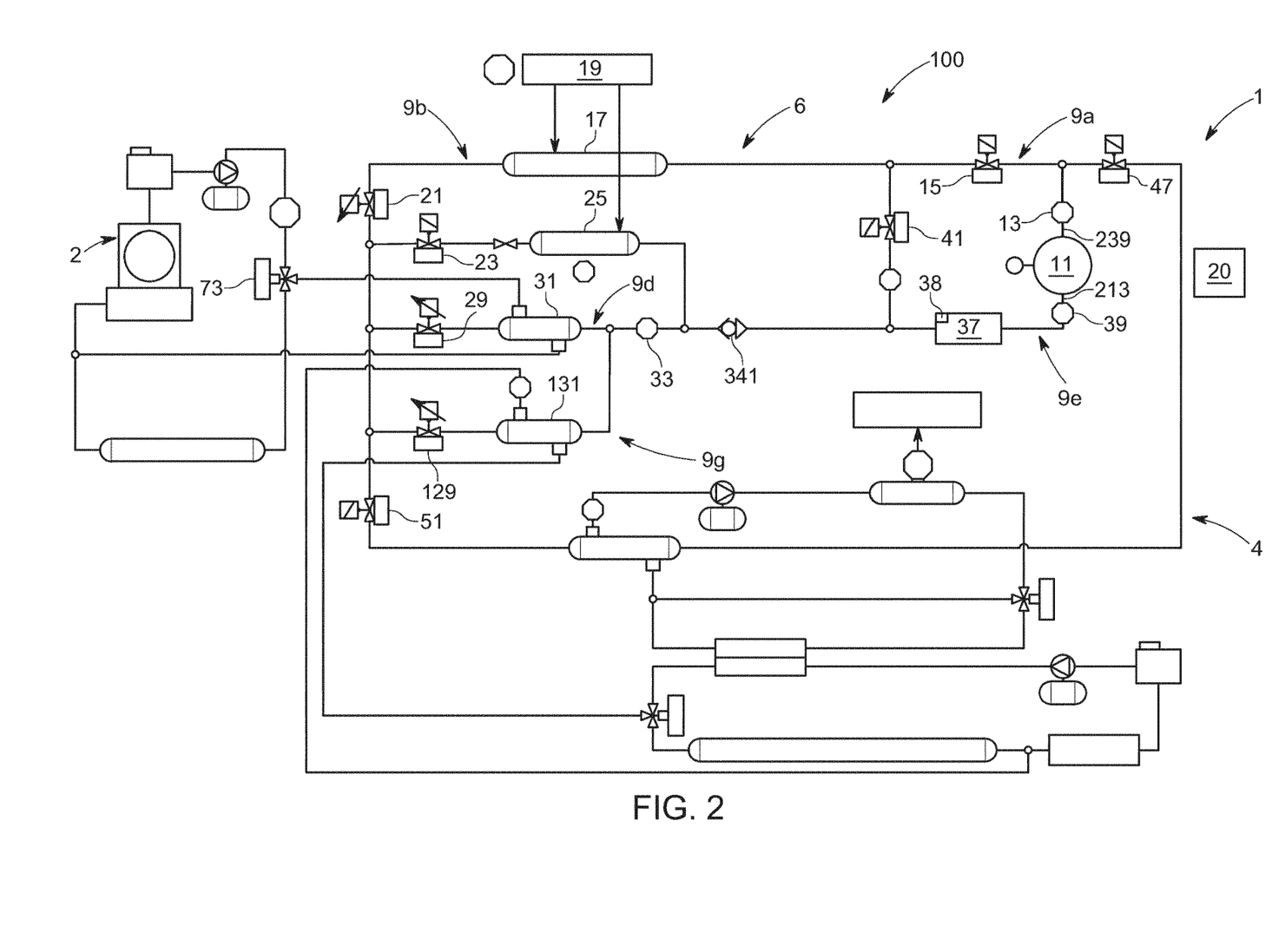
FIG. 2 shows a lubricant management system for the vehicle flux management system of FIG. 1 according to an embodiment of the invention, operable to allow lubricant mixture trapped within the vehicle flux management system to be flushed to the accumulator lubricant storage capacity.

According to an embodiment of the invention, as shown in FIG. 2, the lubricant management system 100 for the vehicle heat flux management system 1 is engaged by instruction from the controller 20 to close the shut off valves 41, 47 and 51 in the heat pump circuit 4 in order to isolate the heat pump circuit from the refrigeration circuit 6. Shut off valves 23 and 73 are closed to isolate the second external heat exchanger 25 and the additional heat energy source circuit 2 from the refrigeration circuit 6. The lubricant management system 100 comprises the heat pump condenser 17 and its associated expansion valve 21, the evaporator 31 and its associated expansion valve 29 and the evaporator 131 and its associated expansion valve 129, the accumulator 37 and its lubricant delivery means (e.g. drip tube or internal orifice and associated filter net with the U-shaped tube in the accumulator 38), compressor 11 and shut off valve 15.

As the heat flux management system 1 operates, the lubricant content within the refrigerant mixture is stripped and collects in various parts of the system 1 such as the various condenser(s) and evaporator(s) in the refrigeration circuit 6 and the heat pump circuit 4. Sensor 39, operably linked to controller 20, is operable to monitor the lubricant content of the refrigerant within the refrigeration and heat pump circuits 6, 4. A lubricant content of 1.5 to 4% (volume/volume) is monitored by sensor 39. The controller 20 is operable to switch the lubricant management system 100 into a lubrication management mode when a timer (not shown) detects that 10 hours of operation of the heat flux management system 1 have passed or, alternatively, when the controller 20 determines that a vehicle charging event is underway. In the lubrication management mode the flow rate of the refrigerant mixture from the heat pump condenser 17 to one of evaporators 31 and 131 is increased by actuating the expansion valve 21 and throttling the flow rate of refrigerant through the valve to the evaporator 31, 131. The increased flow rate is sufficient to flush the trapped lubricant from the evaporator 31, 131 downstream towards the accumulator 37 and the lubricant storage capacity within the accumulator 37. Expansion valves 29 and 129 are sequentially operable to provide the increased (flush) flow rate of refrigerant to the evaporator 31 and to the evaporator 131 respectively. When valve 29 is open, valve 129 is closed and when valve 29 is closed, valve 129 is open. In this way, the flow rate through each evaporator 31,131 is sufficient to flush the lubricant from the evaporator 31, 131 to the lubricant storage capacity of the accumulator 37.

It is envisaged that the valves 29 and 129 could be open at the same time to flush both evaporator 31 and evaporator 131 contemporaneously.

Sensor 39 is operable to monitor the lubricant content of the refrigerant mixture and is arranged to connect to controller 20 which is operable to initiation the lubricant management mode when a timer (not shown) detects that 10 hours of operation of the heat flux management system 1 have passed or, alternatively, when the controller 20 determines that a vehicle charging event is underway. The controller 20 is operable to actuate the expansion valves 21, 29, 129 for the delivery of the refrigerant mixture with the required vapour quality and lubricant content of about 1.5% to 4% oil to ensure that the compressor 11 remains functional.

In operation of system 1, refrigerant/lubricant mixture in a state of low temperature and low pressure is drawn in at the compressor 11 suction side 213 and is transformed by the compressor 11 into a high temperature, high pressure gas. The temperature and pressure at the compressor 11 outlet 239 is monitored by the pressure and temperature sensor 13. The mixture then flows into the external heat exchanger 17 acting as a condenser and the associated expansion valve 21, where it continues downstream through the expansion valve 29 and associated evaporator 31 and through the expansion valve 129 and associated evaporator 131 before the refrigerant mixture vaporises and is redirected to the refrigerant accumulator 37 at the compressor 11 suction side 213. A pressure and temperature sensor 33 is located in refrigerant line 9d and is operable to monitor the pressure and temperature of the refrigerant gas at the output of the evaporators 31, 131.

After the vehicle heat flux management system 1 has been operating for prolonged periods of time, lubricant content is collected in various parts of the system. Sensor 39 associated with the accumulator 37 monitors the refrigerant mixture content. When a timer (not shown) detects that 10 hours of operation of the heat flux management system 1 have passed or, alternatively, when the controller 20 determines that a vehicle charging event is underway, the controller 20 is operable to open the expansion valve 29 associated with the evaporator 31 and close the expansion valve 129 in associated with the evaporator 131 and to throttle expansion valve 21 to increase the flow rate of refrigerant through to valves 29, 129. This allows the refrigerant mixture to flow downstream from the expansion valve 21 at an increased flow circulation rate compared to that in the refrigeration and heat pump modes of operation. In this way trapped lubricant is flushed from the evaporator 31 downstream towards the accumulator 37. The controller 20 is operable to open the expansion valve 129 associated with the evaporator 131 and close the expansion valve 29 associated with the evaporator 31. This allows the refrigerant mixture to flow downstream from the expansion valve 21 to the evaporator 131 at an increased flow circulation rate compared to that in the refrigeration and heat pump modes of operation and to flush trapped lubricant from the evaporator 131 in the downstream towards the accumulator 37.

The flow circulation rate of the refrigerant mixture through the evaporators 31, 131 can be increased further after a period of operation of the heat flux management system 1 or when a vehicle charging event is underway. The controller 20 associated is operable to throttle the expansion valve 21 associated with the heat pump condenser 17 to fully open the valve 21 and to direct an increased refrigerant mixture flow through the evaporators 31, 131 downstream towards the refrigerant accumulator 39, and in so doing flushes the trapped lubricant content into the accumulator 37 lubricant storage capacity.

In each of the circuits of FIGS. 1 and 2, the controller 20 can be a controller, a control unit or a module such as a programmable electronic control unit (ECU), which is operable to switch the refrigerant management system 100 between any one of a number of modes. The controller 20 may be the vehicle central management system processor. The lubricant delivery means 38 (e.g. the drip tube or internal orifice and associated filter net with the U-shaped tube in the accumulator) is in fluid communication with the lubricant storage capacity of the accumulator 37 and is operable under the direction of controller 20 to inject lubricant into the refrigerant mixture to increase the lubricant content of the refrigerant mixture. The lubricant management system 100 is disengaged when the vehicle charging event ends or, alternatively, after a 5 minute flushing circulation rate period has elapsed, and the operating circulation rate of the refrigerant mixture is restored.

In the Figures, the controller 20 is operably connected to the system 1 and the components thereof. For the sake of clarity, the connections between the controller 20 and the components of the system 1 are not shown.

Figure 3:
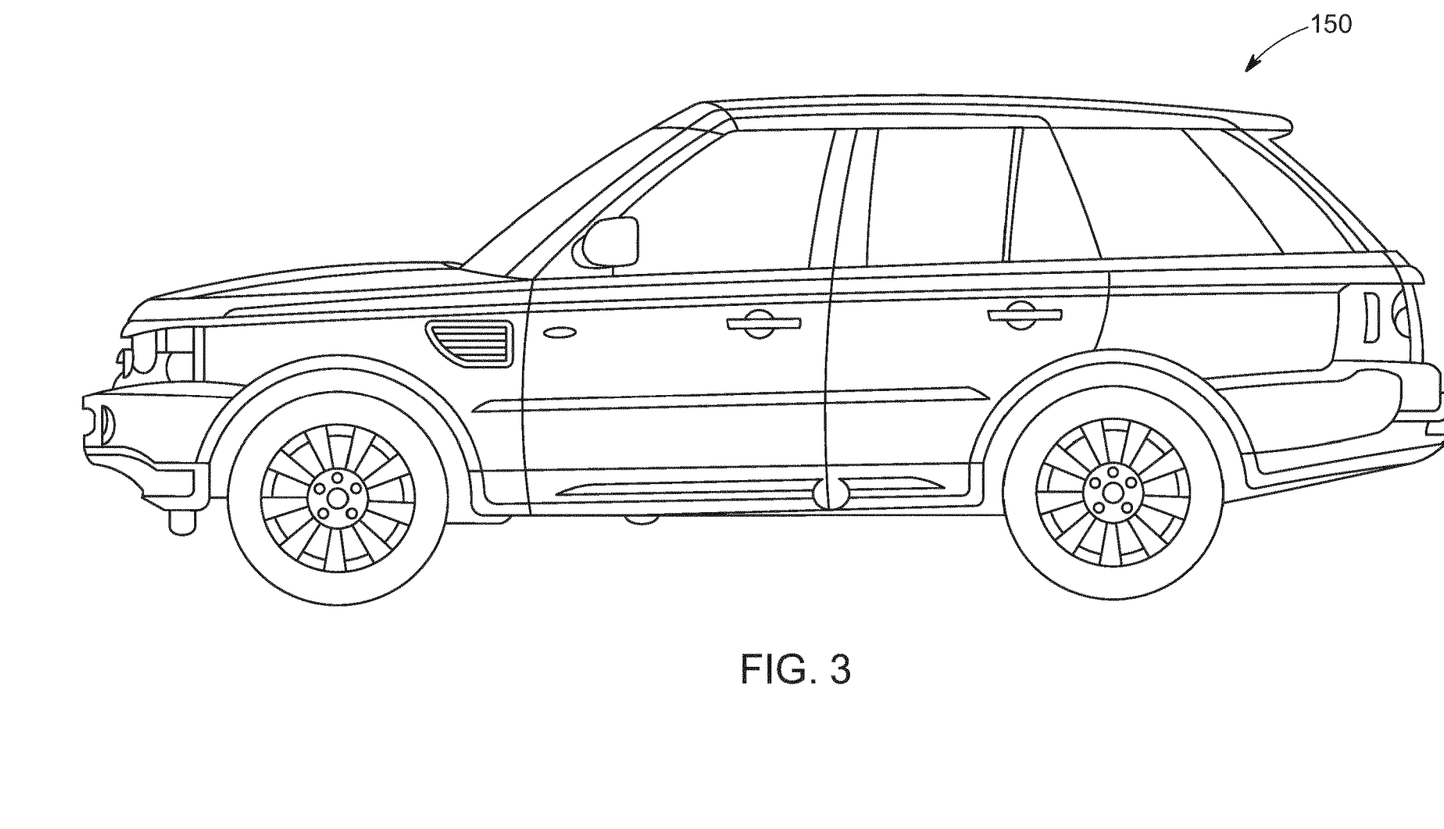
FIG. 3 shows a vehicle comprising the lubricant management system of FIG. 2.

FIG. 3 shows an electric vehicle 150 comprising a heat flux management system 1 comprising a lubricant management system 100 of the invention. The central management system (not shown) of the vehicle is operably linked to the controller 20 of the system 1.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A lubricant management system, comprising a vehicle air conditioning circuit comprising a refrigeration cycle refrigerant circuit comprising at least a condenser in thermal communication with a heat source, at least two evaporators each associated with an expansion valve, and a refrigerant compressor, wherein the condenser, the at least two evaporators, the expansion valves and the refrigerant compressor are fluidly connected to one another by a refrigerant line, an accumulator having a lubricant storage capacity and comprising lubricant delivery means, the accumulator being fluidly coupled in the refrigerant line downstream of the at least two evaporators and upstream of the refrigerant compressor,     wherein the at least two evaporators are each fluidly connected in parallel downstream of the condenser and upstream of the accumulator and the associated expansion valves are operable to control a refrigerant flow rate through the at least two evaporators sequentially to flush lubricant from the at least two evaporators to the lubricant storage capacity of the accumulator;

wherein a further expansion valve is associated with the condenser, and wherein the further expansion valve is configured to be throttled to increase the circulation rate of refrigerant mixture to the first or second evaporator to a flushing circulation rate.

2. The lubricant management system according to claim 1, wherein the at least two evaporators of the refrigeration cycle refrigerant circuit comprises four evaporators each with an associated expansion valve.

3. The lubricant management system according to claim 1, wherein the at least two evaporators are two or more of: a powertrain chiller, a battery chiller, a cabin evaporator and a condenser/evaporator.

4. The lubricant management system according to claim 1, wherein the accumulator comprises a sensor operable to monitor lubricant content in a refrigerant mixture.

5. The lubricant management system according to claim 1, further comprising a controller configured to actuate the expansion valves associated with each of the at least two evaporators.

6. The lubricant management system according to claim 5, wherein the controller is operable to open the expansion valve associated with a first evaporator of the at least two evaporators and close the expansion valve associated with a second evaporator of the at least two evaporators.

7. The lubricant management system according to claim 6, wherein the controller is operable to open the expansion valve associated with the second evaporator and close the expansion valve associated with the first evaporator.

8. The lubricant management system according to claim 6, wherein the controller is operable to actuate fluid flow sequentially through the first evaporator and then through the second evaporator.

9. The lubricant management system according to claim 1, wherein the further expansion valve associated with the condenser is operable to control refrigerant mixture flow between the heat pump condenser and the at least two evaporators.

10. The lubricant management system according to claim 9, further comprising a controller configured to actuate the further expansion valve associated with the condenser.

11. The lubricant management system according to claim 10, wherein the controller actuates the further expansion valve associated with the condenser to induce an increased refrigerant mixture circulation rate capable of flushing trapped lubricant from the at least two evaporators to the accumulator.

12. A heat flux management system comprising the lubricant management system according to claim 1.

13. An electric vehicle comprising an engine and the heat flux management system according to claim 12, wherein the engine is electrochemically powered.

14. A method of lubricant management in an electric vehicle, comprising:
providing the lubricant management system according to claim 1;
operating the refrigerant compressor to initiate a refrigerant mixture circulation in the refrigerant circuit for a selected time period at an operating circulation rate;
closing the expansion valve associated with the first evaporator of the at least two evaporators;
opening the expansion valve associated with the second evaporator of the at least two evaporators;
flushing refrigerant mixture through the second evaporator to flush lubricant trapped in the second evaporator to the accumulator;
opening the closed expansion valve associated with the first evaporator;
closing the open expansion valve associated with the second evaporator; and
flushing refrigerant mixture through the first evaporator to flush lubricant trapped in the first evaporator to the accumulator,
wherein the further expansion valve associated with the condenser is throttled to increase the circulation rate of refrigerant mixture to the first or second evaporator to the flushing circulation rate.

15. The method according to claim 14, wherein the flushing circulation rate is applied for between 2 and 5 minutes.

16. The lubricant management system according to claim 5, further comprising an accumulator sensor operably linked to the controller which is configured to actuate the lubricant delivery means to maintain a required content of lubricant in the refrigerant mixture.

17. The lubricant management system according to claim 16, wherein the required content is between about 1.5% and about 4% (volume/volume) oil.

18. The lubricant management system according to claim 11, wherein the increased refrigerant mixture circulation rate to provide flushing of the trapped lubricant is higher than the operating refrigerant mixture circulation rate during a cooling or heating cycle of refrigerant in the air conditioning circuit.

19. The heat flux management system according to claim 12, comprising a heat pump circuit with a heating function comprising at least one thermodynamic cycler fluidly connected to the condenser and the refrigerant compressor by a refrigerant line.

20. A lubricant management system for use in an electric vehicle that includes a closed loop refrigerant circuit having a condenser, at least two evaporators, at least two evaporator expansion valves, and a refrigerant compressor, wherein each of the at least two evaporator expansion valves is associated with a different one of the at least two evaporators, and wherein the condenser, the at least two evaporators, the at least two expansion valves, and the refrigerant compressor are fluidly connected in the closed loop refrigerant circuit by a refrigerant line that carries a refrigerant through the closed loop refrigerant circuit, wherein the lubricant management system comprises:
a condenser expansion valve associated with the condenser and fluidly connected in the closed loop refrigerant circuit downstream of the condenser and upstream of the at least two evaporators;
an accumulator having a lubricant storage capacity and being fluidly connected in the closed loop refrigerant circuit so as to supply into the refrigerant line a lubricant fluid that combines with the refrigerant in the refrigerant line to thereby form a refrigerant mixture, wherein the accumulator is located downstream of the at least two evaporators and upstream of the refrigerant compressor; and
a controller operably connected to the condenser expansion valve and the at least two evaporator expansion valves;
wherein the at least two evaporators are each fluidly connected in parallel downstream of the condenser and upstream of the accumulator;
wherein the controller is operable in one mode to open all of the at least two evaporator expansion valves and in another mode to close any one or more of the at least two evaporator expansion valves while maintaining at least one other evaporator expansion valve open to thereby provide an increased refrigerant mixture flow rate through one or more evaporators of the at least two evaporators that are associated with an open one of the at least two evaporator expansion valves; and wherein the condenser expansion valve is configured to be throttled by the controller to control a circulation rate of the refrigerant mixture through the one or more evaporators that are associated with the open one of the at least two evaporator expansion valves.

\* \* \* \* \*